US012538218B2

(12) United States Patent
Diao et al.

(10) Patent No.: US 12,538,218 B2
(45) Date of Patent: Jan. 27, 2026

(54) SYSTEMS AND METHODS FOR SIGNALING TRANSMISSION FOR SIDELINK RELAY COMMUNICATIONS

(71) Applicant: ZTE Corporation, Guangdong (CN)

(72) Inventors: Xueying Diao, Guangdong (CN); Mengzhen Wang, Guangdong (CN); Lin Chen, Guangdong (CN)

(73) Assignee: ZTE Corporation, Shenzhen (CN)

( * ) Notice: Subject to any disclaimer, the term of this patent is extended or adjusted under 35 U.S.C. 154(b) by 724 days.

(21) Appl. No.: 17/877,171

(22) Filed: Jul. 29, 2022

(65) Prior Publication Data

US 2022/0369186 A1 Nov. 17, 2022

Related U.S. Application Data

(63) Continuation of application No. PCT/CN2020/083451, filed on Apr. 7, 2020.

(51) Int. Cl.
*H04W 48/18* (2009.01)
*H04W 8/18* (2009.01)
(Continued)

(52) U.S. Cl.
CPC .......... *H04W 48/18* (2013.01); *H04W 36/033* (2023.05); *H04W 88/04* (2013.01)

(58) Field of Classification Search
CPC ............... H04W 48/18; H04W 36/033; H04W 36/00835; H04W 88/04; H04W 88/18;
(Continued)

(56) References Cited

U.S. PATENT DOCUMENTS

2016/0127963 A1  5/2016 Masini et al.
2016/0197927 A1  7/2016 Ma et al.
(Continued)

FOREIGN PATENT DOCUMENTS

CN   104662993 A   5/2015
CN   106162777 A   11/2016
(Continued)

OTHER PUBLICATIONS

Communication pursuant to Article 94(3) EPC issued in European Patent Application No. 20 895 444.6 dated Mar. 5, 2025, 14 pages.
(Continued)

*Primary Examiner* — Jenee Holland
(74) *Attorney, Agent, or Firm* — Crowell & Moring LLP (57) ABSTRACT

Systems and methods for performing signaling transmission or exchange for wireless sidelink relay communications are described. In one embodiment, a method performed by a first network node is disclosed. The method comprises: obtaining, from a wireless communication device, a first indication information indicating that the wireless communication device supports a sidelink relay communication involving the wireless communication device; transmitting, to a second network node, a second indication information generated based on the first indication information; and obtaining, from the second network node, a third indication information indicating whether the wireless communication device is authorized to perform the sidelink relay communication.

16 Claims, 6 Drawing Sheets

(51) Int. Cl.
*H04W 36/00* (2009.01)
*H04W 40/24* (2009.01)
*H04W 76/14* (2018.01)
*H04W 88/04* (2009.01)

(58) Field of Classification Search
CPC .. H04W 40/246; H04W 40/248; H04W 76/14
See application file for complete search history.

(56) References Cited

U.S. PATENT DOCUMENTS

| | | | | |
|---|---|---|---|---|
| 2019/0306754 | A1* | 10/2019 | Shan | H04W 8/06 |
| 2019/0350047 | A1 | 11/2019 | Shan et al. | |
| 2020/0053802 | A1 | 2/2020 | Li et al. | |
| 2020/0077253 | A1* | 3/2020 | Kim | H04W 76/30 |
| 2020/0100088 | A1 | 3/2020 | Kim et al. | |
| 2020/0213927 | A1* | 7/2020 | Buckley | H04W 36/36 |
| 2020/0267508 | A1* | 8/2020 | Fischer | G01S 5/02 |
| 2020/0374956 | A1* | 11/2020 | Zhu | H04W 28/10 |
| 2021/0076368 | A1* | 3/2021 | Malkamäki | H04W 72/51 |
| 2021/0092666 | A1* | 3/2021 | Hampel | H04W 24/02 |
| 2021/0092667 | A1* | 3/2021 | Zhu | H04W 40/24 |
| 2021/0126991 | A1* | 4/2021 | Huang | H04L 69/22 |
| 2021/0160768 | A1* | 5/2021 | Akman | H04W 28/0268 |
| 2021/0282050 | A1* | 9/2021 | Adjakple | H04L 1/1874 |
| 2021/0392710 | A1* | 12/2021 | Yang | H04W 84/005 |
| 2022/0070753 | A1* | 3/2022 | Edge | H04W 4/029 |
| 2022/0167189 | A1* | 5/2022 | Shi | H04W 24/00 |
| 2022/0408333 | A1* | 12/2022 | Ryu | H04L 67/146 |
| 2023/0019346 | A1* | 1/2023 | Li | H04W 28/14 |
| 2023/0052699 | A1* | 2/2023 | Ninglekhu | H04W 48/16 |
| 2023/0082507 | A1* | 3/2023 | Mcmenamy | H04W 72/20 370/315 |
| 2023/0135827 | A1* | 5/2023 | Kim | H04W 48/12 370/329 |
| 2023/0188948 | A1* | 6/2023 | Zhu | H04W 4/06 370/329 |

FOREIGN PATENT DOCUMENTS

| | | |
|---|---|---|
| CN | 110603892 A | 12/2019 |
| CN | 110679190 A | 1/2020 |
| EP | 3 148 285 A1 | 3/2017 |
| WO | 2016/165049 A1 | 10/2016 |
| WO | 2018/063084 A1 | 4/2018 |
| WO | WO 2018/063081 A1 | 4/2018 |
| WO | WO 2018/186552 A1 | 10/2018 |

OTHER PUBLICATIONS

3GPP "NG-RAN; NG Application Protocol (NGAP) (Release 16)", 3GPP TS 38.413 V16.1.0, Mar. 31, 2020, 341 pages.
Eventhelix: "5G Standalone Access Registration", Nov. 17, 2018, 13 pages.
Japanese Office Action with English translation, dated Jan. 15, 2024, pp. 1-8, issued in Japanese Patent Application No. 2022-546395.
Intel, Solution of 5GC Capable UE behind 5G-RG connected to 5GC via NG-RAN/W-5GAN, Oct. 15-19, 2018, pp. 1-9, SA WG2 Meeting SA2#129, S2-181046 (revision of S2-18xxxx).
Ericsson, Discussion on remaining aspects of support of NR V2X over F1, Feb. 24-Mar. 6, 2020, pp. 1-16, 3GPP TSG-RAN WG3 #107-e, R3-201022.
3GPP TS 36.300 V16.0.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2" (Release 16), Dec. 2019 (366 pages).
3GPP TR 23.713 V13.0.0, "3rd Generation Partnership Project; Technical Specification Group Services and System Aspects; Study on extended architecture support for proximity-based services" (Release 13), Sep. 2015 (80 pages).
3GPP TS 38.401 V16.10, "3rd Generation Partnership Project; Technical Specification Group Radio Access Network; NG-RAN; Architecture description", (Release 16), Mar. 2020 (54 pages).
InterDigital Inc., "New Solution on Service Authorization, Provisioning for UE-to-NW relay", SA WG2 Meeting #136AH, S2-2001665, Jan. 13, 2020 (3 pages).
Extended European Search Report, May 25, 2023, pp. 1-15, issued in European Application No. 20895444.6, European Patent Office, Munich, Germany.
Chinese Office Action with English translation, Oct. 24, 2024, pp. 1-15, issued in Chinese Application No. 202080099332.3, State Intellectual Property Office, Beijing, China.
International Search Report from WO 2021/109382A1, dated Jan. 4, 2021.
Huawei et al. "Discussion and TP on sidelink relay communication". *3GPP TSG-RAN WG2 Meeting #93 R2-161079*, Feb. 19, 2016 (Feb. 19, 2016).

* cited by examiner

SYSTEMS AND METHODS FOR SIGNALING TRANSMISSION FOR SIDELINK RELAY COMMUNICATIONS

This application is a continuation application of PCT International Application No. PCT/2020/083451, filed with the China National Intellectual Property Administration, PRC on Apr. 7, 2020, which is herein incorporated by reference in its entirety.

TECHNICAL FIELD

The disclosure relates generally to wireless communications and, more particularly, to systems and methods for performing signaling transmission or exchange for wireless sidelink relay communications.

BACKGROUND

With the development of wireless multimedia services, there is an increasing demand for high data rates and better user experiences, which places higher requirements on the system capacity and coverage of traditional cellular networks. On the other hand, application scenarios such as public safety, social networking, short-range data sharing, and local advertising gradually increase people's needs of proximity services to understand and communicate with nearby people or things. A traditional cellular network with a centric base station has obvious limitations in terms of high data rates and support for proximity services. As such, a device-to-device (D2D) communication technology has emerged accordingly. The application of D2D technology can reduce the burden on the cellular network, reduce the battery power consumption of user equipment, increase the data rate, and improve the robustness of the network infrastructure, which can well meet the requirements of the high data rate services and proximity services. A D2D communication may also be called a proximity service (ProSe) or a sidelink (SL) communication.

In order to support a wider range of applications and services, a relay communication based on a sidelink can extend the coverage and improve power consumption, such as in indoor relay communications, intelligent agriculture, intelligent factories, public security and so on. Compared to a long-term evolution (LTE) sidelink communication, a fifth generation (5G) new radio (NR) sidelink communication is quite different in terms of e.g. the frame structure, quality of service (QoS) processing, bearer configuration and establishment, etc. As such, a technology solution for the LTE-based sidelink relay communication is not suitable for a 5G NR system. There is no existing technology solution for a NR-based sidelink relay communication.

SUMMARY

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a first network node is disclosed. The method comprises: obtaining, from a wireless communication device, a first indication information indicating that the wireless communication device supports a sidelink relay communication involving the wireless communication device; transmitting, to a second network node, a second indication information generated based on the first indication information; and obtaining, from the second network node, a third indication information indicating whether the wireless communication device is authorized to perform the sidelink relay communication.

In another embodiment, a method performed by a first network node is disclosed. The method comprises: determining a handover of a wireless communication device from a source network node to a target network node; determining that the wireless communication device supports a sidelink relay communication involving the wireless communication device; and transmitting, to the target network node, an indication information indicating that whether the wireless communication device is authorized to perform the sidelink relay communication.

In a further embodiment, a method performed by a main network node is disclosed. The method comprises: determining a secondary network node for establishing a multi-connectivity between a wireless communication device and at least the main and secondary network nodes; determining that the wireless communication device supports a sidelink relay communication involving the wireless communication device; and transmitting, to the secondary network node, an indication information indicating that whether the wireless communication device is authorized to perform the sidelink relay communication.

In a different embodiment, a method performed by a first network node is disclosed. The method comprises: determining that a wireless communication device to be connected to a target network node supports a sidelink relay communication involving the wireless communication device; obtaining, for each of a plurality of second network nodes, indication information indicating whether the second network node supports the sidelink relay communication involving the wireless communication device; and selecting, based on the indication information from each of the plurality of second network nodes, at least one of the plurality of second network nodes to be the target network node.

In another embodiment, a method performed by a first network node is disclosed. The method comprises: obtaining, from a second network node, a first indication information indicating that a wireless communication device associated with the second network node supports a sidelink relay communication involving the wireless communication device; and transmitting, to the second network node, a second indication information indicating whether the wireless communication device is authorized to perform the sidelink relay communication.

In yet another embodiment, a method performed by a first network node is disclosed. The method comprises: receiving, from a second network node, an indication information indicating that whether a wireless communication device is authorized to perform a sidelink relay communication involving the wireless communication device. The first network node is a target network node to perform a handover of the wireless communication device from a source network node to the target network node.

In still another embodiment, a method performed by a secondary network node is disclosed. The method comprises: receiving, from a main network node, an indication information indicating that whether a wireless communication device is authorized to perform a sidelink relay communication involving the wireless communication device, for establishing a multi-connectivity between the wireless communication device and at least the main and secondary network nodes.

In a further embodiment, a method performed by a first network node is disclosed. The method comprises: determining whether the first network node supports a sidelink relay communication for connecting a wireless communication device to a target network node; and transmitting, to a second network node, indication information indicating whether the first network node supports the sidelink relay communication involving the wireless communication device, wherein the second network node determines, based on the indication information, whether the first network node is selected to be the target network node.

In a different embodiment, a communication node configured to carry out a disclosed method in some embodiment is disclosed.

In yet another embodiment, a non-transitory computer-readable medium having stored thereon computer-executable instructions for carrying out a disclosed method in some embodiment is disclosed.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "BS") that each provides geographical radio coverage, and one or more wireless user equipment devices (typically known as a "UE") that can transmit and receive data within the radio coverage. In the wireless communication network, a BS and a UE can communicate with each other via a communication link, e.g., via a downlink radio frame from the BS to the UE or via an uplink radio frame from the UE to the BS. Two UEs can communicate with each other via a sidelink, which may include a relay. A 5G BS may be located at the network side that includes various network nodes, e.g. next generation radio access network (NG-RAN) base station, user plane function (UPF), session management function (SMF), access and mobility control function (AMF), etc.

In various embodiments, a BS in the present disclosure can be referred to as a network side and can include, or be implemented as, a next Generation Node B (gNB), an E-UTRAN Node B (eNB), a Transmission/Reception Point (TRP), an Access Point (AP), etc.; while a UE in the present disclosure can be referred to as a terminal and can include, or be implemented as, a mobile station (MS), a station (STA), etc. A BS and a UE may be described herein as non-limiting examples of "wireless communication nodes," and "wireless communication devices" respectively, which can practice the methods disclosed herein and may be capable of wireless and/or wired communications, in accordance with various embodiments of the present disclosure.

Figure 1:
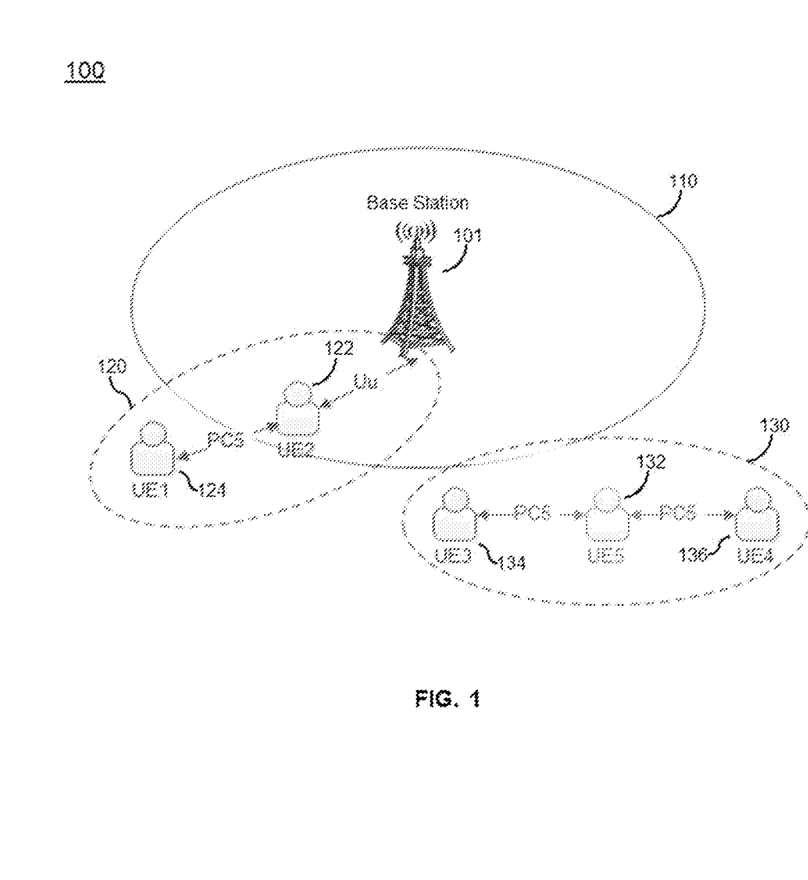
FIG. 1 illustrates an exemplary communication network in which techniques disclosed herein may be implemented, in accordance with some embodiments of the present disclosure.

FIG. 1 illustrates an exemplary communication network 100 in which techniques disclosed herein may be implemented, in accordance with some embodiments of the present disclosure. As shown in FIG. 1, the exemplary communication network 100 includes a base station (BS) 101 and a plurality of UEs, UE 1 124, UE 2 122, UE 3 134, UE 4 136 . . . UE 5 132. The BS 101 is located in a cell 110, while each of the plurality of UEs is located at the edge of the cell 110 or outside the cell 110.

While the BS 101 can communicate with a UE according to wireless protocols, two UEs can also communicate with each other based on a sidelink relay, to support a wider range of applications and services. A sidelink relay communication mainly has two application scenarios: a UE-to-Network relay mode and a UE-to-UE relay mode.

As shown in FIG. 1, in the UE-to-Network relay mode 120, the UE 1 124 has a poor quality signal from the BS network 101, but can communicate with the network 101 through the UE 2 122 which is near the UE 1 124 and has a network coverage of the network 101. In this case, the UE 2 122 is called a UE-to-Network relay; and the UE 1 124 is called a remote UE. The UE-to-Network relay mode 120 may be used for a relay communication of a UE with weak or no network coverage, which can help operators to expand coverage and increase capacity. In one embodiment, there may be additional relay UE(s) between the BS network 101 and the UE 1 124 to form a multi-hop UE-to-Network sidelink relay communication between the BS network 101 and the UE 1 124. The interface between devices or UEs may be a PC5 interface. The interface between a UE and the network may be a Uu interface.

As shown in FIG. 1, in the UE-to-UE relay mode 130, the UE 3 134 and the UE 4 136 can perform data communications through the UE 5 132, wherein the UE 5 132 is called a UE-to-UE relay; the UE 3 134 and the UE 4 136 are called remote UEs. In one embodiment, there may be additional relay UE(s) between the UE 3 134 and the UE 4 136 to form a multi-hop UE-to-UE sidelink relay communication between the UE 3 134 and the UE 4 136. The UE-to-UE relay mode 130 may enable an inter-device sidelink communication through a relay UE, to extend a sidelink communication range or handle an emergency like earthquake where the cellular network is not working properly.

Figure 2:
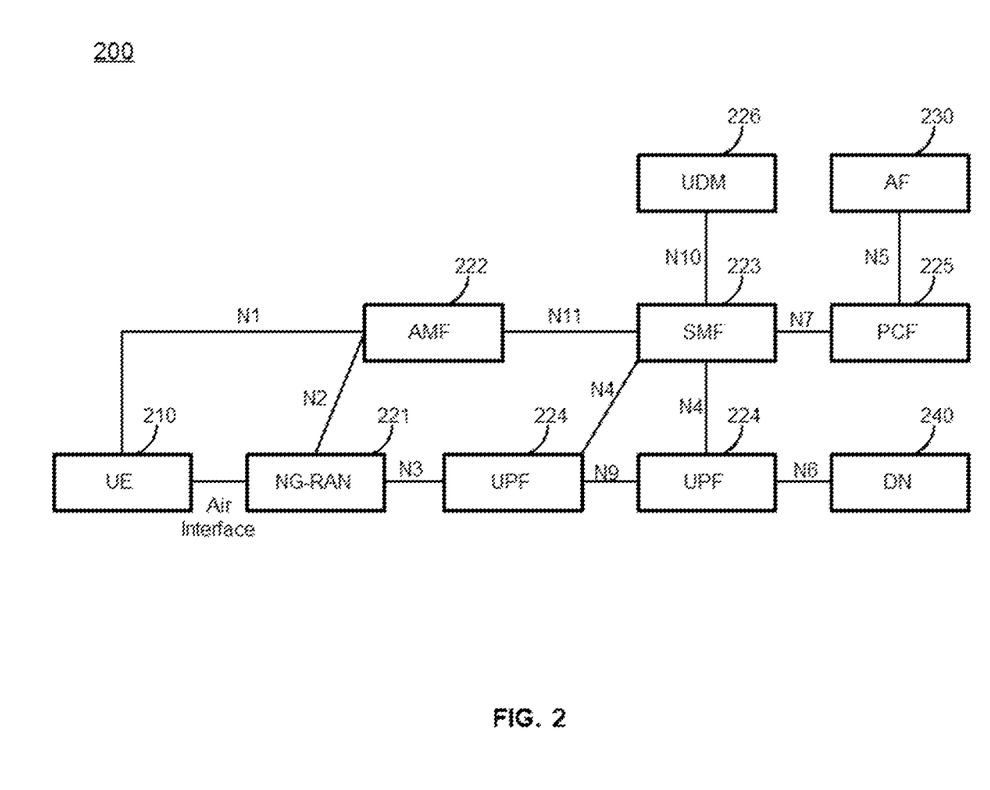
FIG. 2 illustrates an exemplary architecture diagram of a 5G system in which techniques disclosed herein may be implemented, in accordance with some embodiments of the present disclosure.

FIG. 2 illustrates an exemplary architecture diagram of a 5G system 200 in which techniques disclosed herein may be implemented, in accordance with an embodiment of the present disclosure. As shown in FIG. 2, the 5G system 200 includes at least one UE 210, a base station next generation radio access network (NG-RAN) 221, an access and mobility control function (AMF) 222, a session management function (SMF) 223, at least one user plane function (UPF) 224, a policy control function (PCF) 225, a unified data management (UDM) 226, an application function (AF) 230, and a data network (DN) 240.

The network nodes or elements in the architecture are described as follows. The terminal or UE 210 obtains the service through the wireless air interface of the 5G network. The terminal 210 exchanges information through the air interface with the base station 221, and exchanges information with the management entities (e.g. the AMF 222, the SMF 223) of the core network through the non-access stratum (NAS) signaling. The 5G base station (NG-RAN) 221 is responsible for resource scheduling and connection management of the air interface for the terminal 210 to access network. The next generation base station may be a new radio access technology (gNB) or an enhanced LTE technology (eLTE).

The AMF 222 is a common control plane function in the core network. For the 3GPP access, a user has only one AMF, which is responsible for authentication, authorization, and subscription checking of the user to ensure that the user is a legitimate user. The user mobility management includes location registration and temporary identity allocation. When the user initiates a request for establishing a Packet Data Unit (PDU) session, the AMF 222 selects an appropriate SMF, forwards non-access stratum (NAS) signaling between the UE and the SMF 223, and forwards the Access Stratum (AS) signaling between the base station 221 and the SMF 223.

The SMF 223 interacts with the terminal 210, and is mainly responsible for processing the PDU session establishment, modification, and deletion requests, selecting the UPF, and establishing the user plane connection from the UE to the UPF, and determining the QoS parameters of the session with the PCF 225.

The UPF 224 provides user plane processing functions, including data forwarding and QoS execution. The UPF 224 also provides user plane anchors during a movement of a user to ensure business continuity. There may be one or more UPFs on the path from the UE 210 to the DN 240. The media plane data between the two UPFs and between the UPF and the 5G base station are encapsulated in the GTP-U (GPRS Tunneling Protocol user plane) protocol for transmission.

The PCF 225 supports a unified policy framework, provides resource authorization, and provides policy rules to the control plane. The UDM 226 stores user subscription data. The AF 230 provides business functions, and can request resource authorization from the PCF 225.

The DN 240 provides a data network for a business. In the context of the present teaching, a DN may be a network in which the industrial system/and vertical industry application is located. The service data of the industrial system and vertical industry application reaches the 5G network UPF through the N6 interface, and finally reaches the UE through the UPF, NG-RAN for downlink transmission, and vice versa for the uplink transmission.

A QoS framework is defined in the 5G system. The UE 210 can request to establish a PDU session, where a default QoS flow is established in the process. Then the UE or the network can add a new dedicated QoS flow in the PDU session through a PDU session modification process. Each QoS flow has a corresponding QoS parameter, such as 5G QoS identifier (5QI), guaranteed bandwidth (for GBR-type QoS flow), packet delay budget (PDB) for the delay from the UE to the UPF at the entrance/exit of the 5G network (i.e. the UPF connected to the N6 interface), the packet error rate (PER), the filter set, etc.

During the process of UE requesting to establish a PDU session, or during the PDU session modification process, the SMF 223 obtains the QoS parameters from the PCF 225 and sends at least part of the QoS parameters to the UE 210, the NG-RAN 221, and the UPF 224. For example, the filter set, the uplink and downlink bandwidth is sent to the UPF 224; the uplink and downlink bandwidth, PDB, PER, etc. are sent to the NG-RAN 221, and the filter set, the priority, the uplink and downlink bandwidth, etc. are sent to the UE 210.

Time synchronization is needed between network nodes in the TSN network, where each node needs to be synchronized by the gPTP protocol with the master clock in the network to achieve synchronization between nodes. After the internal network nodes (such as UPF, SMF, NG-RAN) and 5G UEs of the 5G network are synchronized with the master clock, the local times at the UPF, SMF, NG-RAN and UE are consistent with at most a negligible error.

Figure 3:
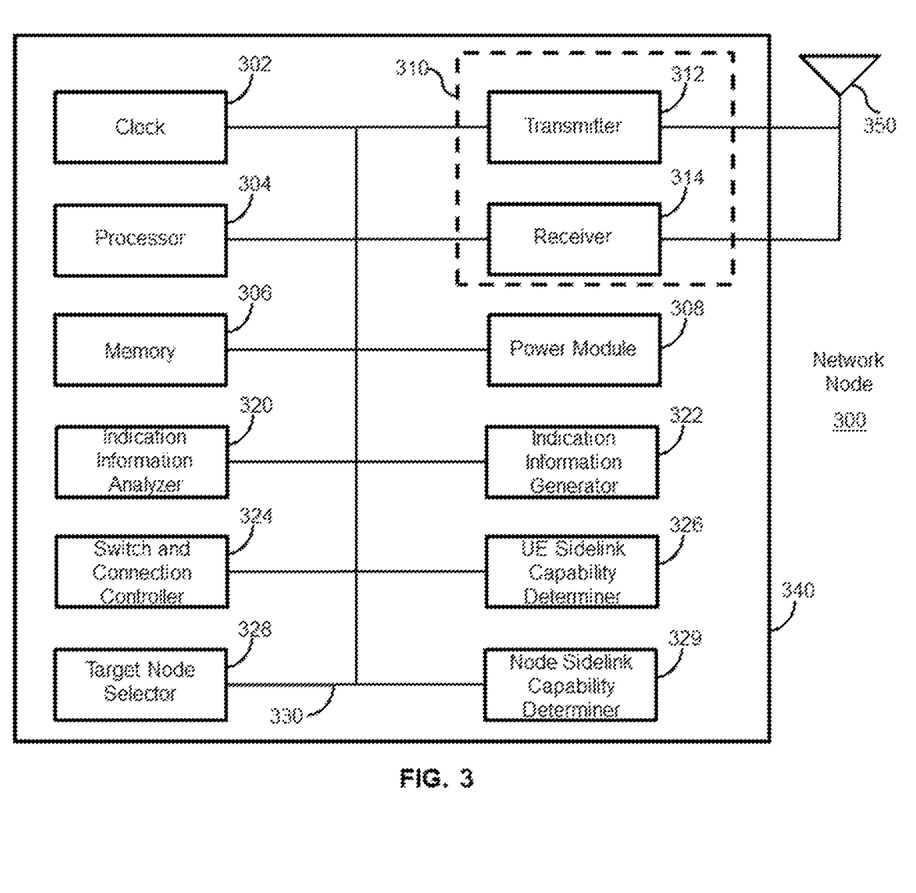
FIG. 3 illustrates a block diagram of a network node, in accordance with some embodiments of the present disclosure.

FIG. 3 illustrates a block diagram of a network node 300, in accordance with some embodiments of the present disclosure. The network node 300 is an example of a device that can be configured to implement the various methods described herein. As shown in FIG. 3, the network node 300 includes a housing 340 containing a system clock 302, a processor 304, a memory 306, a transceiver 310 comprising a transmitter 312 and receiver 314, a power module 308, an indication information analyzer 320, an indication information generator 322, a switch and connection controller 324, a UE sidelink capability determiner 326, a target node selector 328, and a node sidelink capability determiner 329.

In this embodiment, the system clock 302 provides the timing signals to the processor 304 for controlling the timing of all operations of the network node 300. The processor 304 controls the general operation of the network node 300 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 306, which can include both read-only memory (ROM) and random access memory (RAM), can provide instructions and data to the processor 304. A portion of the memory 306 can also include non-volatile random access memory (NVRAM). The processor 304 typically performs logical and arithmetic operations based on program instructions stored within the memory 306. The instructions (a.k.a., software) stored in the memory 306 can be executed by the processor 304 to perform the methods described herein. The processor 304 and memory 306 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 310, which includes the transmitter 312 and receiver 314, allows the network node 300 to transmit and receive data to and from a remote device (e.g., the BS or another UE). An antenna 350 is typically attached to the housing 340 and electrically coupled to the transceiver 310. In various embodiments, the network node 300 includes (not shown) multiple transmitters, multiple receivers, multiple transceivers, and/or multiple antennas. The transmitter 312 can be configured to wirelessly transmit packets having different packet types or functions, such packets being generated by the processor 304. Similarly, the receiver 314 is configured to receive packets having different packet types or functions, and the processor 304 is configured to process packets of a plurality of different packet types. For example, the processor 304 can be configured to determine the type of packet and to process the packet and/or fields of the packet accordingly.

A UE may establish an access to a network node or a base station, and have the capability to perform a sidelink relay communication, by being a relay UE and/or a remote UE. In accordance with various embodiments, the network node 300 may be either a base station or a device performing a network function of a core network, to support a sidelink relay communication.

In one embodiment, the network node 300 is referred to as a first network node. The indication information analyzer 320 may obtain, via the receiver 314 from a UE associated with the first network node, a first indication information indicating that the UE supports a sidelink relay communication involving the UE, and analyze the first indication information. In one embodiment, the first indication information is obtained based on at least one of the following from the UE: a radio resource control (RRC) setup request message, a RRC setup complete message, a sidelink relay single network slice selection assistance information (S-NSSAI), a UE-to-Network sidelink relay S-NSSAI, or a UE-to-UE sidelink relay S-NSSAI.

In one embodiment, the indication information generator 322 may generate and transmit, via the transmitter 312 to a second network node, a second indication information based on the first indication information. The indication information analyzer 320 may obtain, via the receiver 314 from the second network node, a third indication information indicating whether the UE is authorized to perform the sidelink relay communication.

In one embodiment, the second indication information indicates that the UE is capable of being at least one of the following in the sidelink relay communication: a sidelink relay UE, a sidelink remote UE, a UE-to-Network sidelink relay UE, a UE-to-Network sidelink remote UE, a UE-to-UE sidelink relay UE, or a UE-to-UE sidelink remote UE. The third indication information indicates that whether the UE is authorized as at least one of the following in the sidelink relay communication: a sidelink relay and/or remote UE, a UE-to-Network sidelink relay and/or remote UE, or a UE-to-UE sidelink relay and/or remote UE. In one embodiment, a new radio (NR) sidelink or a long-term evolution (LTE) sidelink is used for the sidelink relay communication based on the third indication information.

In one embodiment, based on the third indication information, the indication information analyzer 320 can determine whether the UE is authorized to perform the sidelink relay communication. In one embodiment, the first network node is a base station, and the second network node is a device, e.g. AMF, performing a network function in a core network associated with the base station. The first indication information is obtained based on a radio resource control (RRC) message. The second indication information is transmitted based on a next generation application protocol (NGAP) message or an S1 application protocol (S1AP) message. The third indication information is obtained based on an NGAP message or an S1AP message.

In one embodiment, the indication information generator 322 may generate and transmit, via the transmitter 312 to a third network node, a fourth indication information based on the third indication information. The fourth indication information may indicate that whether the UE is authorized as at least one of the following in the sidelink relay communication: a sidelink relay and/or remote UE, a sidelink relay and/or remote UE to use a NR sidelink for relay services, a sidelink relay and/or remote UE to use a LTE sidelink for relay services, a UE-to-Network sidelink relay and/or remote UE, a UE-to-Network sidelink relay and/or remote UE to use a NR sidelink for relay services, a UE-to-Network sidelink relay and/or remote UE to use a LTE sidelink for relay services, or a UE-to-UE sidelink relay and/or remote UE.

In one embodiment, the first network node is a central unit (CU) of a base station; the third network node is a distributed unit (DU) of the base station; and the second network node is a device, e.g. AMF, performing a network function in a core network associated with the base station. The fourth indication information is transmitted based on an F1 application protocol (F1AP) message.

In another embodiment, the network node 300 is referred to as a first network node. The switch and connection controller 324 may determine a handover of a UE from a source network node to a target network node. The UE sidelink capability determiner 326 may determine that the UE supports a sidelink relay communication involving the UE. As such, the indication information generator 322 may generate and transmit, via the transmitter 312 to the target network node, an indication information indicating that whether the UE is authorized to perform the sidelink relay communication.

In one embodiment, the first network node is a device performing a network function in a core network; the source network node is a first base station associated with the core network; the target network node is a second base station associated with the core network. The indication information may be transmitted based on a NGAP message or an S1AP message.

In another embodiment, the first network node is the source network node and is a first base station; and the target network node is a second base station. The indication information is transmitted via an Xn interface or an X2 interface.

In yet another embodiment, the first network node is a central unit (CU) of a base station; the source network node is a first distributed unit (DU) of the base station; the target network node is a second DU of the base station. The indication information is transmitted based on an F1 application protocol (F1AP) message.

In one embodiment, the indication information indicates that whether the UE is authorized as at least one of the following in the sidelink relay communication: a sidelink relay and/or remote UE; a sidelink relay and/or remote UE to use the NR sidelink for relay services; a sidelink relay and/or remote UE to use the LTE sidelink for relay services; a UE-to-Network sidelink relay and/or remote UE; a UE-to-Network sidelink relay and/or remote UE to use the NR sidelink for relay services; a UE-to-Network sidelink relay and/or remote UE to use the LTE sidelink for relay services; or a UE-to-UE sidelink relay and/or remote UE.

In another embodiment, the network node 300 is referred to as a main network node. The switch and connection controller 324 may determine a secondary network node for establishing a multi-connectivity between a UE and at least the main and secondary network nodes. The UE sidelink capability determiner 326 may determine that the UE supports a sidelink relay communication involving the UE. As such, the indication information generator 322 may generate and transmit, via the transmitter 312 to the secondary network node, an indication information indicating that whether the UE is authorized to perform the sidelink relay communication.

In one embodiment, the indication information is transmitted via an Xn interface or an X2 interface. The indication information indicates that whether the UE is authorized as at least one of the following in the sidelink relay communication: a sidelink relay and/or remote UE, a sidelink relay and/or remote UE to use the NR sidelink for relay services, a sidelink relay and/or remote UE to use the LTE sidelink for relay services, a UE-to-Network sidelink relay and/or remote UE, a UE-to-Network sidelink relay and/or remote UE to use the NR sidelink for relay services, a UE-to-Network sidelink relay and/or remote UE to use the LTE sidelink for relay services, or a UE-to-UE sidelink relay and/or remote UE.

In one embodiment, the network node 300 is referred to as a first network node. The switch and connection controller 324 and the UE sidelink capability determiner 326 may determine that a UE is to be connected to a target network node and supports a sidelink relay communication involving the UE.

The indication information analyzer 320 may obtain, via the receiver 314 for each of a plurality of second network nodes, indication information indicating whether the second network node supports the sidelink relay communication involving the UE. The target node selector 328 in this example may select, based on the indication information from each of the plurality of second network nodes, at least one of the plurality of second network nodes to be the target network node.

In one embodiment, the first network node is a base station; each of the plurality of second network nodes is an AMF associated with the base station. The indication information is obtained from the AMF based on a NGAP message. The indication information obtained from the AMF indicates whether the AMF is capable of supporting at least one of the following: the sidelink relay communication, the sidelink relay communication based on a UE-to-Network sidelink relay, or the sidelink relay communication based on a UE-to-UE sidelink relay.

In one embodiment, the first network node is a source network node of the UE to perform a handover of the UE to the target network node; each of the plurality of second network nodes is a neighbor base station of the source network node. The indication information is obtained from each neighbor base station via an Xn interface or an X2 interface. In another embodiment, the first network node is a main network node of the UE; the target network node is a secondary network node to establish a multi-connectivity between the UE and at least the main and secondary network nodes. The indication information is obtained from each second network node via an Xn interface or an X2 interface. In yet another embodiment, the first network node is a central unit (CU) of a base station; each of the plurality of second network nodes is a distributed unit (DU) of the base station. The indication information is obtained from each DU based on an F1AP message.

In one embodiment, the indication information indicates at least one of the following related to the sidelink relay communication: whether the DU is capable of supporting the sidelink relay communication, the sidelink relay communication based on a UE-to-Network sidelink relay, or the sidelink relay communication based on a UE-to-UE sidelink relay; cell information for supporting the sidelink relay communication, the sidelink relay communication based on a UE-to-Network sidelink relay, or the sidelink relay communication based on a UE-to-UE sidelink relay, wherein the cell information comprises information related to at least one of: frequency, bandwidth, cell physical cell identity (PCI), or cell global identity (CGI); resource pool information for supporting the sidelink relay communication, the sidelink relay communication based on a UE-to-Network sidelink relay, or the sidelink relay communication based on a UE-to-UE sidelink relay; or a system information block (SIB) message comprising configuration information for the sidelink relay communication, the sidelink relay communication based on a UE-to-Network sidelink relay, or the sidelink relay communication based on a UE-to-UE sidelink relay.

In one embodiment, the indication information analyzer 320 may obtain, via the receiver 314 from each neighbor base station of the first network node via an Xn interface or an X2 interface, cell information of the neighbor base station for supporting the sidelink relay communication, the sidelink relay communication based on a UE-to-Network sidelink relay, or the sidelink relay communication based on a UE-to-UE sidelink relay. The cell information comprises information related to at least one of: frequency, bandwidth, cell physical cell identity (PCI), or cell global identity (CGI). The indication information generator 322 may generate and transmit, via the transmitter 312, the cell information of each neighbor base station to each DU. The SIB message may be generated based on the cell information.

In various embodiments, the network node 300 may serve as the second network node or the secondary network node in the above embodiments. In one embodiment, the node sidelink capability determiner 329 may determine whether the network node 300 supports a sidelink relay communication for connecting a UE to a target network node. Then, the indication information generator 322 may generate and transmit, via the transmitter 312 to another network node, indication information indicating whether the network node 300 supports the sidelink relay communication involving the UE, to be considered or selected to be the target network node.

The power module 308 can include a power source such as one or more batteries, and a power regulator, to provide regulated power to each of the above-described modules in FIG. 3. In some embodiments, if the network node 300 is coupled to a dedicated external power source (e.g., a wall electrical outlet), the power module 308 can include a transformer and a power regulator.

The various modules discussed above are coupled together by a bus system 330. The bus system 330 can include a data bus and, for example, a power bus, a control signal bus, and/or a status signal bus in addition to the data bus. It is understood that the modules of the network node 300 can be operatively coupled to one another using any suitable techniques and mediums.

Although a number of separate modules or components are illustrated in FIG. 3, persons of ordinary skill in the art will understand that one or more of the modules can be combined or commonly implemented. For example, the processor 304 can implement not only the functionality described above with respect to the processor 304, but also implement the functionality described above with respect to the indication information analyzer 320. Conversely, each of the modules illustrated in FIG. 3 can be implemented using a plurality of separate components or elements.

Figure 4:
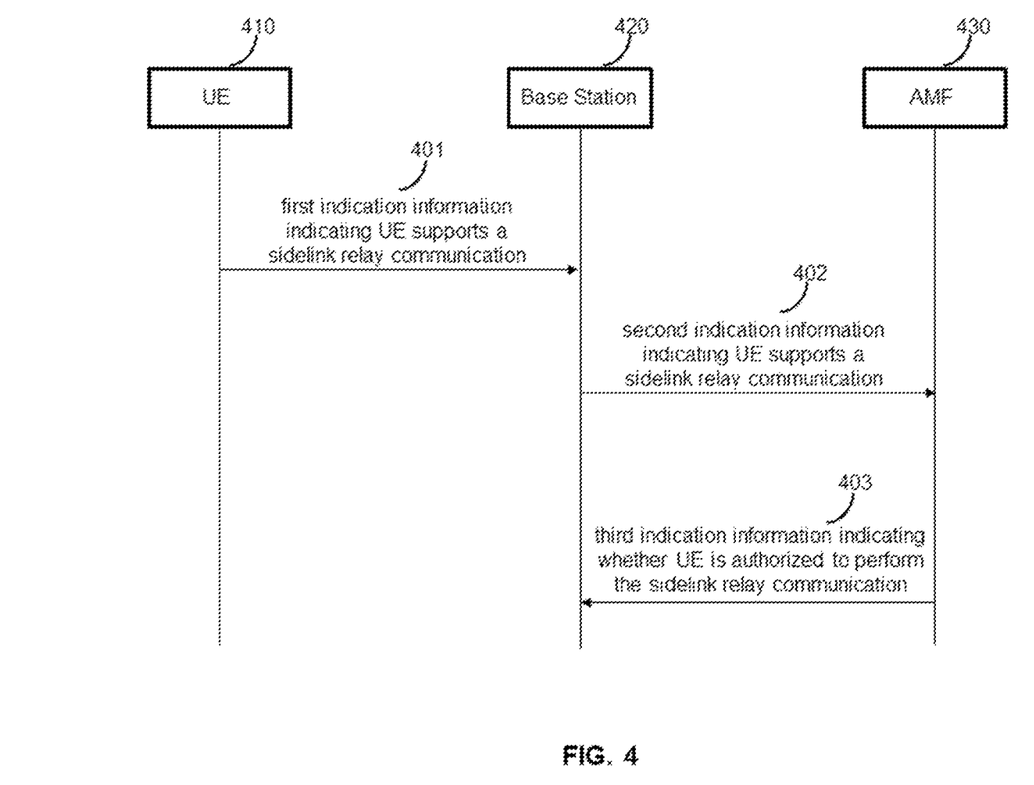
FIG. 4 illustrates an exemplary method for signaling exchange during an access of a user equipment (UE) to a base station (BS), in accordance with some embodiments of the present disclosure.

FIG. 4 illustrates an exemplary method for signaling exchange during an access of a user equipment (UE) 410 to a base station (BS) 420, in accordance with some embodiments of the present disclosure. At operation 401, the UE 410 transmits, to the BS 420, a first indication information indicating the UE 410 supports a sidelink relay communication, e.g. as a relay UE and/or a remote UE. At operation 402, the BS 420 transmits, to the AMF 430, a second indication information indicating that the UE 410 supports a sidelink relay communication. At operation 403, the AMF 430 transmits, to the BS 420, a third indication information indicating whether the UE 410 is authorized to perform the sidelink relay communication.

Figure 5:
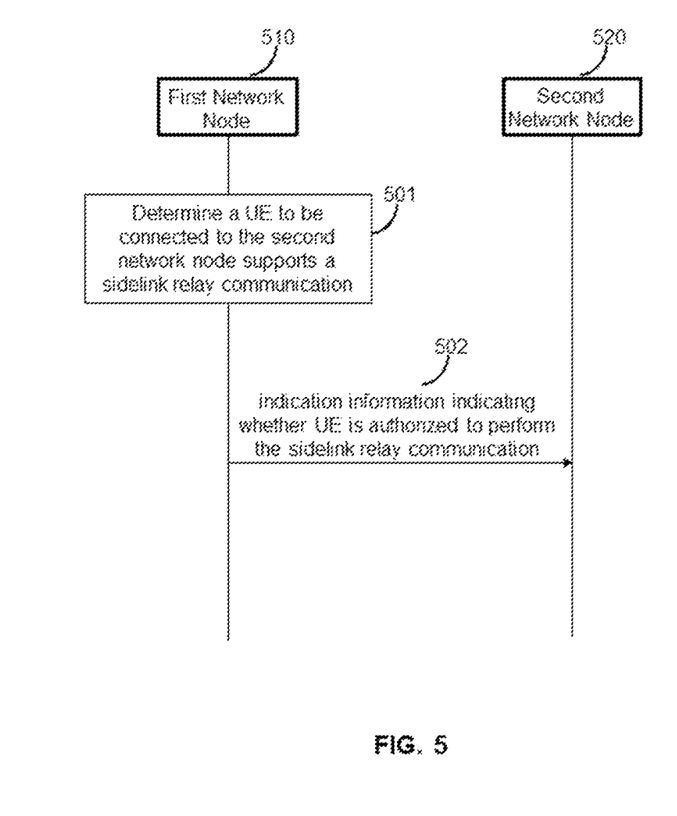
FIG. 5 illustrates an exemplary method for signaling exchange during a handover or connection setup of a UE supporting a sidelink relay communication, in accordance with some embodiments of the present disclosure.

FIG. 5 illustrates an exemplary method for signaling exchange during a handover or connection setup of a UE supporting a sidelink relay communication, in accordance with some embodiments of the present disclosure. At operation 501, a first network node 510 determines that a UE is to be connected to a second network node 520 and supports a sidelink relay communication, e.g. as a relay UE and/or a remote UE. At operation 502, the first network node 510 transmits, to the second network node 520, an indication information indicating whether the UE is authorized to perform the sidelink relay communication.

Figure 6:
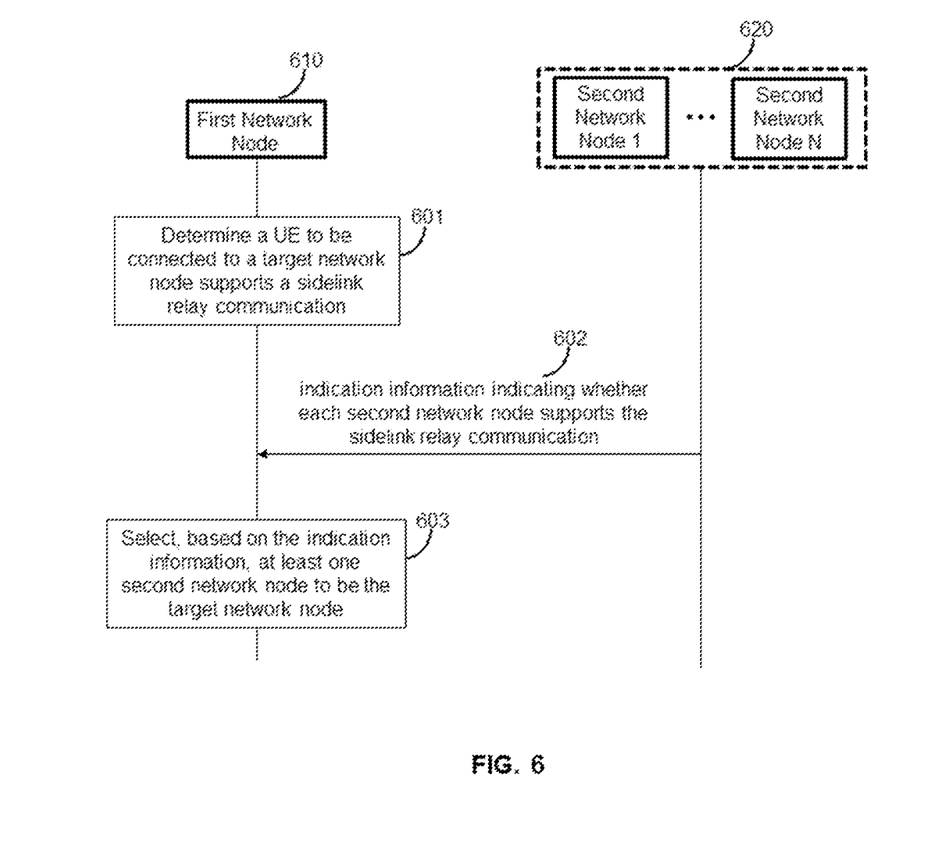
FIG. 6 illustrates an exemplary method for signaling exchange during an interface setup of a UE supporting a sidelink relay communication, in accordance with some embodiments of the present disclosure.

FIG. 6 illustrates an exemplary method for signaling exchange during an interface setup of a UE supporting a sidelink relay communication, in accordance with some embodiments of the present disclosure. At operation 601, a first network node 610 determines that a UE is to be connected to a target network node and supports a sidelink relay communication, e.g. as a relay UE and/or a remote UE. At operation 602, each of N second network nodes 620 transmits, to the first network node 610, an indication information indicating whether the second network node supports the sidelink relay communication. At operation 603, the first network node 610 selects, based on the indication information, at least one of the N second network nodes 620 to be the target network node for the UE.

Different embodiments of the present disclosure will now be described in detail hereinafter. It is noted that the features of the embodiments and examples in the present disclosure may be combined with each other in any manner without conflict.

In a first embodiment, a UE accesses a base station. The UE has the capability to be: a relay UE, a remote UE, or both; and is thereby referred to as a relay/remote UE. The relay/remote UE may indicate the base station, through an RRC message, that the accessing UE is a relay/remote UE. After receiving the RRCSetupComplete message, the base station may transmit the identity information of the relay/remote UE to the core network associate with the base station, for the core network to perform authorization of the accessing UE. Specifically, after the base station learns that the accessing UE is a relay/remote UE through an RRC message, the base station sends at least one of the following information to the core network through an NGAP or S1AP message, such as an INITIAL UE MESSAGE: optionally, a sidelink (SL) relay/remote UE indication information; optionally, a UE-to-Network (UE-to-NW) SL relay/remote UE indication information; optionally, a UE-to-UE SL relay/remote UE indication information.

After receiving the above message, the core network performs an authorization operation on the relay/remote UE, and determines whether the accessed UE is authorized to use the SL for relay communication. If the accessed UE is authorized to use SL for relay communication, the core network transmits, through a NGAP/S1AP message to the base station, at least one of the following information: optionally, SL relay/remote UE authorization information; optionally, indication information indicating authorization of the SL relay/remote UE to use NR SL for relay communication; optionally, indication information indicating authorization of the SL relay/remote UE to use LTE SL for relay communication; optionally, UE-to-NW SL relay/remote UE authorization information; optionally, indication information indicating authorization of the UE-to-NW SL relay/remote UE to use NR SL for relay communication; optionally, indication information indicating authorization of the UE-to-NW SL relay/remote UE to use LTE SL for relay communication; optionally, UE-to-UE SL relay/remote UE authorization information. After receiving the message from the core network, the base station determines whether the accessed UE is authorized to use SL for relay communication according to the authorization/indication information carried in the message.

For a CU/DU split scenario, if the CU obtains authorization information of the accessed UE from the core network, the CU sends the authorization information of the UE to the DU through an F1 interface. The authorization information may include at least one of the following: optionally, the SL relay/remote UE authorization/indication information; optionally, the authorization/indication information for the SL relay/remote UE to use NR SL to perform relay communication; optionally, the authorization/indication information for the SL relay/remote UE to use LTE SL to perform relay communication; optionally, UE-to-NW SL relay/remote UE authorization/indication information; optionally, the authorization/indication information for the UE-to-NW SL relay/remote UE to use NR SL to perform relay communication; optionally, the authorization/indication information for the UE-to-NW SL relay/remote UE to use LTE SL to perform relay communication; optionally, UE-to-UE SL relay/remote UE authorization/indication information.

In a second embodiment, handover and multi-connectivity scenarios are considered. Unlike a conventional UE handover procedure, the target base station needs to know the UE is a relay/remote UE in the handover of the embodiment, to determine whether to permit the handover of the relay/remote UE. If the handover is permitted, the target base station will allocate SL relay resources for the relay/remote UE. There are different cases for the handover or switch scenarios, as listed below.

Case 1 is about switching based on NG/S1 interface. In this case, the core network transmits the relay/remote UE indication information to the target base station via NG/S1 interface, e.g. based on the HANDOVER REQUEST/PATH SWITCH REQUEST ACKNOWLEDGE message.

Case 2 is about switching based on Xn/X2 interface. In this case, the source base station transmits the relay/remote UE indication information to the target base station, through an Xn/X2 interface.

Case 3 is about switching between different DUs, i.e. an inter-gNB-DU mobility. This scenario considers a case when a UE moves from one gNB-DU to another gNB-DU within the same gNB-CU during NR operation. The CU may send the relay/remote UE indication information to the target DU through the F1 interface.

For a multi-connectivity scenario, the secondary node (SN) needs to know that the accessed UE is a relay/remote UE, to configure an SL relay resource pool for the relay/remote UE. The main node (MN) can send the indication information of the relay/remote UE to the SN through the Xn/X2 interface.

The indication information of the relay/remote UE transmitted in the above scenarios in the second embodiment may include at least one of the following: optionally, SL relay/remote UE authorization/indication information; optionally, the authorization/indication information for the SL relay/remote UE to use NR SL to perform relay communication; optionally, the authorization/indication information for the SL relay/remote UE to use LTE SL to perform relay communication; optionally, UE-to-NW SL relay/remote UE authorization/indication information; optionally, the authorization/indication information for the UE-to-NW SL relay/remote UE to use NR SL to perform relay communication; optionally, the authorization/indication information for the UE-to-NW SL relay/remote UE to use LTE SL to perform relay communication; optionally, UE-to-UE SL relay/remote UE authorization/indication information.

In a third embodiment, an interface setup procedure is considered. During the interface setup procedure, an AMF sends to the associated base station via a NGAP message, such as NG SETUP RESPONSE, a capability indication information indicating whether to support the SL relay. The indication information may include at least one of the following: optionally, the capability indication of supporting the SL relay; optionally, the capability indication of supporting the UE-to-NW SL relay; optionally, the capability indication of supporting the UE-to-UE SL relay.

Therefore, the base station can select an AMF that supports the SL relay function for the UE, according to the indication information sent by each AMF. If the core network to which the base station is connected is an evolved packet core (EPC), the mobility management entity (MME) sends the above capability indication information to the base station through an S1AP message, such as S1 SETUP RESPONSE.

In a fourth embodiment, a relay/remote UE wants to switch to another base station or establish a multi-connectivity with an additional base station. The source base station may select a base station that supports the SL relay function for the UE. The source base station may know, e.g. from an operations administration and maintenance (OAM), indication information indicating whether a neighboring base station supports the SL relay. The source base station may also know whether a neighboring base station supports the SL relay function, from the neighboring base station via the Xn/an X2 interface. Specifically, the base stations can exchange at least one of the following information based on an Xn/X2 interface management messages: optionally, the capability indication of supporting the SL relay; optionally, the capability indication of supporting the UE-to-NW SL relay; optionally, the capability indication of supporting the UE-to-UE SL relay; optionally, the cell information for supporting the SL relay, including optionally, the frequency, bandwidth, the cell PCI, or the cell CGI; optionally, the cell information for supporting the UE-to-NW SL relay, including optionally, the frequency, bandwidth, the cell PCI, or the cell CGI; optionally, cell information for supporting the UE-to-UE SL relay, including optionally, the frequency, bandwidth, the cell PCI, or the cell CGI; optionally, resource pool information for supporting the SL relay, the UE-to-NW SL relay, or the UE-to-NW SL relay.

In a fifth embodiment, a CU/DU split scenario is considered, wherein a CU may connect to multiple DUs. But not all the DUs have the same functionality. It is possible that some DUs support SL relay function, but others do not. Thus, during an F1 interface setup procedure, each DU shall indicate the CU whether it supports SL relay function or not. To be specific, DU sends to the CU through an F1AP message, such as F1 SETUP REQUEST/GNB-DU CONFIGURATION UPDATE, at least one of the following: optionally, the capability indication of supporting the SL relay; optionally, the capability indication of supporting the UE-to-NW SL relay; optionally, the capability indication of supporting the UE-to-UE SL relay; optionally, the cell information for supporting the SL relay, including optionally, the frequency, bandwidth, the cell PCI, or the cell CGI; optionally, the cell information for supporting the UE-to-NW SL relay, including optionally, the frequency, bandwidth, the cell PCI, or the cell CGI; optionally, cell information for supporting the UE-to-UE SL relay, including optionally, the frequency, bandwidth, the cell PCI, or the cell CGI; optionally, resource pool information for supporting the SL relay, the UE-to-NW SL relay, or the UE-to-NW SL relay; optionally, a SIB message comprising configuration information for the SL relay, the UE-to-NW SL relay, or the UE-to-UE SL relay.

If DU generates the SIB messages related to SL relay, it needs to obtain information of neighboring cells that support SL relay to construct the SIB messages. If the CU obtains, from the OAM or via Xn/X2 interface, the cell information that a neighboring base station supports the SL relay, the UE-to-NW SL relay, or the UE-to-UE SL relay, the CU sends the obtained cell information to the DU. The cell information may include at least one of: optionally, the frequency, bandwidth, the cell PCI, or the cell CGI.

In a sixth embodiment, a RRC setup procedure is considered. During the RRC setup procedure of a relay/remote UE, the relay/remote UE can indicate an identity of the relay/remote UE to the base station. Therefore, the base station can know that the accessed UE is not a normal UE, and can select a base station that supports the SL relay function for the relay/remote UE. In one example, the relay/remote UE may use an RRCSetupRequest or RRCSetupComplete message to carry the relay/remote UE indication information. In another example, the system may define a SL relay S-NSSAI, a UE-to-NW SL relay S-NSSAI, and/or a UE-to-UE SL relay S-NSSAI. As such, the relay/remote UE may use a defined S-NSSAI to report the relay/remote UE indication information. The base station can determine the identity of the accessed UE based on the S-NSSAI reported by the accessed UE.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method performed by a first network node, the method comprising:
 obtaining, from a wireless communication device, a first indication information indicating that the wireless communication device supports a sidelink relay communication involving the wireless communication device;
 transmitting, to a second network node, a second indication information generated based on the first indication information;
 obtaining, from the second network node, a third indication information indicating whether the wireless communication device is authorized to perform the sidelink relay communication; and
 determining, based on the third indication information, whether the wireless communication device is authorized to perform the sidelink relay communication, wherein:
  the first network node is a central unit (CU) of a base station,
  the second network node is a device performing a network function in a core network associated with the base station,
  the first indication information is obtained based on a radio resource control (RRC) message,
  the second indication information is transmitted based on a next generation application protocol (NGAP) message, and
  the third indication information is obtained based on an NGAP message;
 transmitting, to a third network node, a fourth indication information generated based on the third indication information, wherein:
  the third network node is a distributed unit (DU) of the base station; and
  the fourth indication information is transmitted based on an F1 application protocol (F1AP) message.

2. The method of claim 1, wherein:
 the wireless communication device is a user equipment (UE) associated with the first network node; and
 the second indication information indicates that the UE is capable of being at least one of the following in the sidelink relay communication:
  a sidelink relay UE,
  a sidelink remote UE,
  a UE-to-Network sidelink relay UE,
  a UE-to-Network sidelink remote UE,
  a UE-to-UE sidelink relay UE, or
  a UE-to-UE sidelink remote UE.

3. The method of claim 1, wherein:
 the wireless communication device is a user equipment (UE) associated with the first network node;
 the third indication information indicates that whether the UE is authorized as at least one of the following in the sidelink relay communication:
  a sidelink relay and/or remote UE,
  a UE-to-Network sidelink relay and/or remote UE, or a UE-to-UE sidelink relay and/or remote UE; and
  a new radio (NR) sidelink or a long-term evolution (LTE) sidelink is used for the sidelink relay communication based on the third indication information.

4. The method of claim 1,
 wherein
  the fourth indication information indicates that whether the wireless communication device is authorized as at least one of the following in the sidelink relay communication:
   a sidelink relay and/or remote UE,
   a sidelink relay and/or remote UE based on a new radio (NR) sidelink,
   a sidelink relay and/or remote UE based on a long-term evolution (LTE) sidelink,
   a UE-to-Network sidelink relay and/or remote UE,
   a UE-to-Network sidelink relay and/or remote UE based on a NR sidelink,
   a UE-to-Network sidelink relay and/or remote UE based on a LTE sidelink, or
   a UE-to-UE sidelink relay and/or remote UE.

5. The method of claim 1, wherein:
 the wireless communication device is a user equipment (UE) associated with the first network node; and
 the first indication information is obtained based on at least one of the following from the UE:
  a radio resource control (RRC) setup request message,
  a RRC setup complete message,
  a sidelink relay single network slice selection assistance information (S-NSSAI),
  a UE-to-Network sidelink relay S-NSSAI, or
  a UE-to-UE sidelink relay S-NSSAI.

6. A non-transitory computer-readable medium having stored thereon computer-executable instructions for carrying out the method of claim 1.

7. A method performed by a first network node, the method comprising:
 obtaining, from a second network node, a first indication information indicating that a wireless communication device associated with the second network node supports a sidelink relay communication involving the wireless communication device; and
 transmitting, to the second network node, a second indication information indicating whether the wireless communication device is authorized to perform the sidelink relay communication,
 wherein:
  the second network node is a central unit (CU) of a base station;
  the first network node is a device performing a network function in a core network associated with the base station;
  the first indication information is obtained based on a next generation application protocol (NGAP) message; and
  the second indication information is transmitted based on an NGAP message, and
 wherein the second indication information is transmitted to the CU of the base station to cause the CU to:
  determine, based on the second indication information, whether the wireless communication device is authorized to perform the sidelink relay communication; and
  transmit, to a third network node, a third indication information generated based on the second indication information, wherein:
   the third network node is a distributed unit (DU) of the base station; and
   the third indication information is transmitted based on an F1 application protocol (F1AP) message.

8. The method of claim 7, wherein:
the wireless communication device is a user equipment (UE); and
the first indication information indicates that the UE is capable of being at least one of the following in the sidelink relay communication:
a sidelink relay UE,
a sidelink remote UE,
a UE-to-Network sidelink relay UE,
a UE-to-Network sidelink remote UE,
a UE-to-UE sidelink relay UE, or
a UE-to-UE sidelink remote UE.

9. The method of claim 7, wherein:
the wireless communication device is a user equipment (UE);
the second indication information indicates that whether the UE is authorized as at least one of the following in the sidelink relay communication:
a sidelink relay and/or remote UE,
a UE-to-Network sidelink relay and/or remote UE, or a UE-to-UE sidelink relay and/or remote UE; and
a new radio (NR) sidelink or a long-term evolution (LTE) sidelink is used for the sidelink relay communication based on the second indication information.

10. The method of claim 7, wherein:
the second network node transmits, to a third network node, a third indication information generated based on the second indication information, wherein
the third indication information indicates that whether the wireless communication device is authorized as at least one of the following in the sidelink relay communication:
a sidelink relay and/or remote UE,
a sidelink relay and/or remote UE based on a new radio (NR) sidelink,
a sidelink relay and/or remote UE based on a long-term evolution (LTE) sidelink,
a UE-to-Network sidelink relay and/or remote UE,
a UE-to-Network sidelink relay and/or remote UE based on a NR sidelink,
a UE-to-Network sidelink relay and/or remote UE based on a LTE sidelink, or
a UE-to-UE sidelink relay and/or remote UE.

11. The method of claim 7, wherein:
the wireless communication device is a user equipment (UE) that transmits, to the second network node, an indication information indicating that the UE supports the sidelink relay communication based on at least one of the following from the UE:
a radio resource control (RRC) setup request message,
a RRC setup complete message,
a sidelink relay single network slice selection assistance information (S-NSSAI),
a UE-to-Network sidelink relay S-NSSAI, or
a UE-to-UE sidelink relay S-NSSAI.

12. A first network node comprising:
a memory storing a plurality of instructions; and
at least one processor configured to execute the plurality of instructions, and upon execution of the plurality of instructions, is configured to cause the first network node to:
obtain, from a wireless communication device, a first indication information indicating that the wireless communication device supports a sidelink relay communication involving the wireless communication device;
transmit, to a second network node, a second indication information generated based on the first indication information;
obtain, from the second network node, a third indication information indicating whether the wireless communication device is authorized to perform the sidelink relay communication;
determine, based on the third indication information, whether the wireless communication device is authorized to perform the sidelink relay communication; and
transmit, to a third network node, a fourth indication information generated based on the third indication information, wherein:
the first network node is a central unit (CU) of a base station,
the second network node is a device performing a network function in a core network associated with the base station,
the first indication information is obtained based on a radio resource control (RRC) message,
the second indication information is transmitted based on a next generation application protocol (NGAP) message,
the third indication information is obtained based on an NGAP message,
the third network node is a distributed unit (DU) of the base station, and
the fourth indication information is transmitted based on an F1 application protocol (F1AP) message.

13. The first network node of claim 12, wherein:
the wireless communication device is a user equipment (UE) associated with the first network node; and
the second indication information indicates that the UE is capable of being at least one of the following in the sidelink relay communication:
a sidelink relay UE,
a sidelink remote UE,
a UE-to-Network sidelink relay UE,
a UE-to-Network sidelink remote UE,
a UE-to-UE sidelink relay UE, or
a UE-to-UE sidelink remote UE.

14. The first network node of claim 12, wherein:
the wireless communication device is a user equipment (UE) associated with the first network node;
the third indication information indicates that whether the UE is authorized as at least one of the following in the sidelink relay communication:
a sidelink relay and/or remote UE,
a UE-to-Network sidelink relay and/or remote UE, or a UE-to-UE sidelink relay and/or remote UE; and
a new radio (NR) sidelink or a long-term evolution (LTE) sidelink is used for the sidelink relay communication based on the third indication information.

15. The first network node of claim 12, wherein
the fourth indication information indicates that whether the wireless communication device is authorized as at least one of the following in the sidelink relay communication:
a sidelink relay and/or remote UE,
a sidelink relay and/or remote UE based on a new radio (NR) sidelink,
a sidelink relay and/or remote UE based on a long-term evolution (LTE) sidelink,
a UE-to-Network sidelink relay and/or remote UE,
a UE-to-Network sidelink relay and/or remote UE based on a NR sidelink, a UE-to-Network sidelink relay and/or remote UE based on a LTE sidelink, or a UE-to-UE sidelink relay and/or remote UE.

16. The first network node of claim 12, wherein:

the wireless communication device is a user equipment (UE) associated with the first network node; and the first indication information is obtained based on at least one of the following from the UE:

a radio resource control (RRC) setup request message, a RRC setup complete message, a sidelink relay single network slice selection assistance information (S-NSSAI), a UE-to-Network sidelink relay S-NSSAI, or a UE-to-UE sidelink relay S-NSSAI.

* * * * *